July 22, 1941.   J. R. SKOVERSKI   2,250,278
SWIVEL FOR FISHING TACKLE
Original Filed May 12, 1937
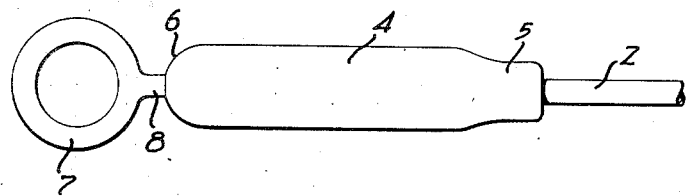
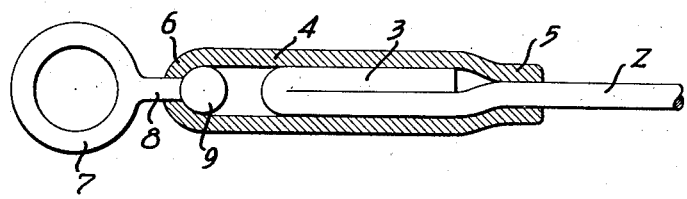
INVENTOR
JOHN R. SKOVERSKI
BY *Charles J. Evans*
HIS ATTORNEY Patented July 22, 1941

2,250,278

UNITED STATES PATENT OFFICE 2,250,278

SWIVEL FOR FISHING TACKLE

John R. Skoverski, San Francisco, Calif., assignor to Joseph Schor, San Francisco, Calif.

Original application May 12, 1937, Serial No. 142,153. Divided and this application February 9, 1940, Serial No. 318,066

2 Claims. (Cl. 43—28)

This is a division of my copending application, Serial No. 142,153, filed May 12, 1937, and issued as Patent Number 2,189,841.

My invention relates to a swivel on the end of a leader; and it is among the objects of my invention to provide improved means for fastening the swivel to the end of a gut leader.

Another object is to provide a fastening means which affords a smooth, unobvious connection between the parts, without the bulkiness and detractive characteristics of the usual type of fastening devices.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a side view showing my improvements in fishing tackle; and

Figure 2 is a sectional view disclosing the means for fastening the swivel to the end of a leader.

In terms of broad inclusion, my improvements in fishing tackle comprise a leader, a swivel head, and an element permanently fastened to the leader and providing a socket for the head. The fastening element preferably comprises a sleeve clamped over lapping portions of the leader.

In greater detail, and referring to the drawing, my fishing tackle comprises a leader 2, preferably of gut, having an end portion 3 turned back to lap the main strand of the leader. A fastening element is provided by a sleeve 4 embracing the lapped portions of the leader. This sleeve may either be a piece of seamless tubing or formed from flat sheet material.

The fastening sleeve is preferably clamped to the leader by deforming the inner end into a reduced neck portion 5 about the main strand adjacent the back-folded portion 3. This reduced neck need not grip the main strand tightly since the lapped portions of the leader are locked within the sleeve by the restrictions formed by the neck. For better security however, neck 5 is preferably forced firmly against the main strand. If still additional security is desired the body of the sleeve may be compressed against the lapped portions of the leader.

In the preferred form of my tackle the fastening sleeve 4 projects beyond the fold at the end of the leader and has its edges 6 crimped inwardly to provide a socket for a swivel head. The latter head preferably comprises an eye 7 having a shank 8 terminating in a ball 9 seated within the socket provided by sleeve 4.

In making this device from ordinary tubing the swivel head is inserted into one end of the tube and the folded leader into the other end. Edges 6 are then crimped to retain the swivel head, and the other end of the tube is compressed to form neck 5.

I claim:

1. Fishing tackle comprising a leader having an end folded back to lap the main strand thereof, and a sleeve of metallic tubing having a body of substantially uniform diameter snugly embracing the lapping portions of the leader, the inner end of the sleeve extending along the main strand beyond said lapping portions and being compressed inwardly to provide a reduced neck about the main strand to lock the lapping portions within the body of the sleeve.

2. Fishing tackle comprising a leader having an end folded back to lap the main strand thereof, a sleeve of metallic tubing having a body of substantially uniform diameter snugly embracing the lapping portions of the leader, the inner end of the sleeve extending along the main strand beyond said lapping portions and compressed inwardly to provide a reduced neck about the main strand to lock the lapping portions within the body of the sleeve, the outer end of the sleeve projecting beyond the folded end of the leader and having its edges crimped inwardly to provide a swivel socket, and a swivel head in said socket.

JOHN R. SKOVERSKI.